Aug. 4, 1942.  W. A. REICHEL  2,292,090
CONSTANT SPEED GYROSCOPE
Filed Nov. 7, 1940

Inventor.
Wladimir A. Reichel.
By Cerstvik & Kalman
Attorneys.

Patented Aug. 4, 1942

2,292,090

UNITED STATES PATENT OFFICE 2,292,090

CONSTANT SPEED GYROSCOPE

Wladimir A. Reichel, Hackensack, N. J., assignor to Bendix Aviation Corporation, Bendix, N. J., a corporation of Delaware Application November 7, 1940, Serial No. 364,723

9 Claims. (Cl. 253—52)

This invention relates generally to gyroscopic instruments and more particularly to rotors therefor and their speed control.

Various applications of the gyroscopic principle have been made and are at present utilized in instruments such as, for example, gyroscopic rate of turn indicators, directional gyroscopes and artificial horizons. In order that such instruments may be capable of efficient operation, it is desirable that the speed of rotation of the gyro rotors be maintained constant, particularly in rate of turn indicators. Air pressure for driving the gyro rotors is generally supplied either from the aircraft engine by operating a pressure or suction pump, or by using the suction produced by the intake manifold of the engine, or by a Venturi tube projecting from the wing of the aircraft. In all these instances, however, the air pressure varies with the speed of the engine or the craft and consequently the speed of rotation of the gyroscope rotors of the instruments varies accordingly. When the gyroscope rotor is driven by electrical energy, changes in the source of supply affect the speed of rotation.

One of the objects of the present invention, therefore, is to provide novel means for regulating the speed of rotation of the rotor of a gyroscope whereby the speed may be maintained substantially constant.

Another object of the invention is to provide, in a gyroscope, novel speed controlling means responsive to the speed of the gyro rotor for setting up eddy currents, whereby the rotor speed is controlled so as to remain substantially constant.

A further object of the invention is to provide in combination with a gyroscope, novel control means for producing eddy currents therein proportional to the speed of rotation of the gyroscopic rotor and controlling the speed of rotation of the rotor in accordance with such currents.

Another object of the invention is to provide, in a gyroscope, novel speed control means for controlling the rotation of the rotor including an angularly movable member actuated by the control means for modifying the driving medium for the rotor.

A further object of the invention is to provide, in a gyroscope, novel speed control means for controlling the rotation of the rotor comprising rotating magnetic means and an angularly movable member whereby the latter is actuated in accordance with eddy currents set up therein by the magnetic means for modifying the driving medium for the rotor.

The above and other objects and advantages of the invention will appear more fully hereinafter from a consideration of the detailed description which follows, taken together with the accompanying drawing. It is to be expressly understood, however, that the drawing is for the purpose of illustration and description only and is not designed as a definition of the limits of the invention, reference being primarily had for this purpose to the appended claims.

The novel control arrangement, as herein disclosed, is shown applied to a turn indicator but it is to be expressly understood that the device is not limited to such use alone.

In the drawing, wherein like reference characters refer to like parts throughout the several views.

Figures 1, 2, 3:
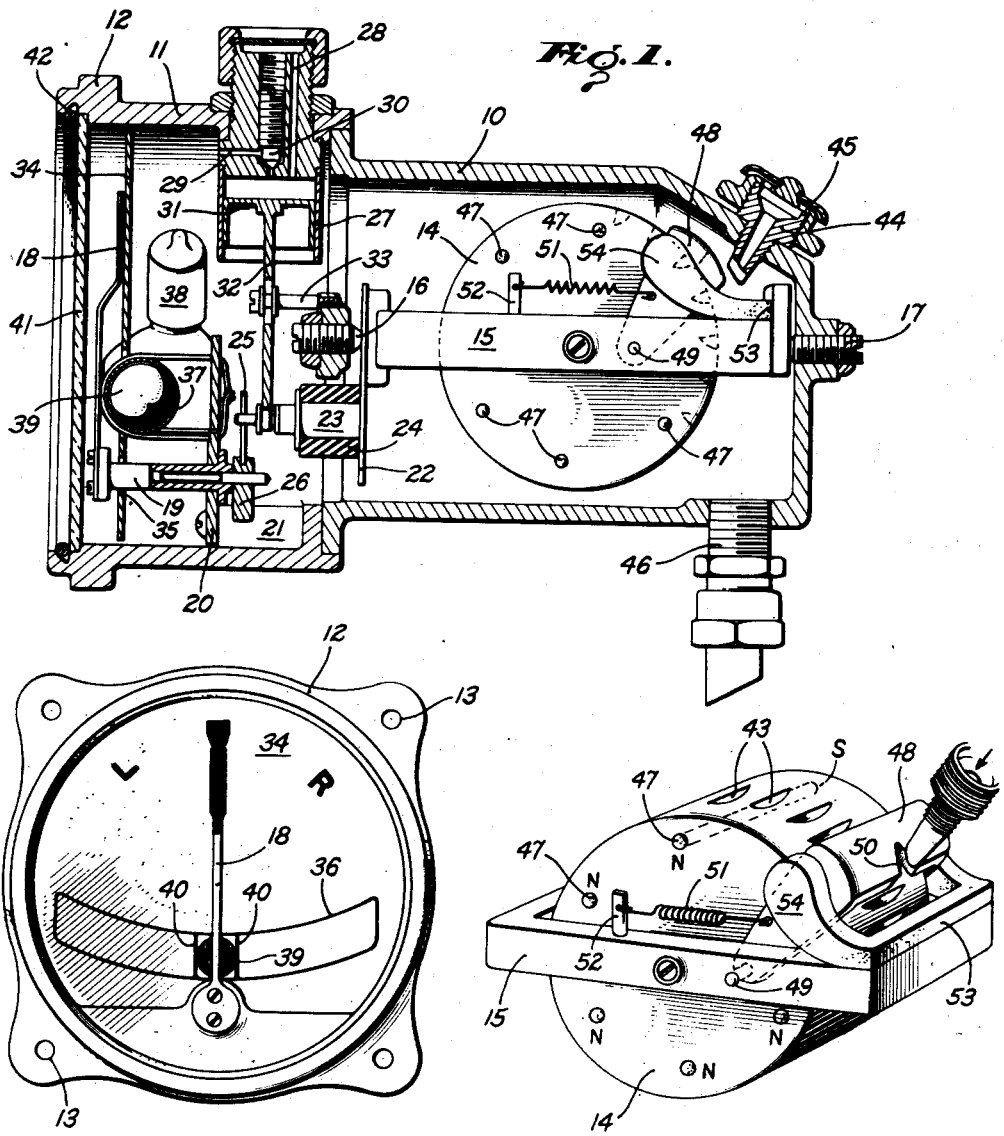
Figure 1 is a side elevation, partly in section, illustrating a turn indicator embodying the present invention.
Figure 2 is a front elevation view of the instrument shown in Figure 1.
Figure 3 is a perspective view of the gyro rotor of Figure 1 having the invention applied thereto.

Referring now to the drawing and more particularly to Figure 1, thereof, the invention is shown as applied to a rate of turn gyroscope having an airtight casing 10 provided with an enlarged portion 11 having an annular flange 12 provided with ears or lugs 13 for suitably mounting the device on an instrument panel of an aircraft.

The gyro rotor 14 is mounted for spinning about a normally horizontal axis within a suitable gimbal frame 15 mounted within the casing for angular movement about a horizontal axis perpendicular to the spin axis defined by adjustable pivots 16 and 17.

A suitable pointer 18 carried by a shaft 19 rotatably mounted in a supporting member 20 secured to the casing by a spacer 21 indicates the precessional movements of the rotor about the axis 16 and 17. The rotor movements are transmitted to the pointer 18 by way of a plate 22 carried by the gimbal frame and having a pin 23 secured thereto enclosed within a rubber bushing 24, the pin having a small extension which engages a pair of pins 25 mounted on and carried by a counter weight 26 secured on an extension of pointer shaft 19.

Suitable damping and neutralizing means may be provided for constraining oscillations of the gimbal frame and returning it to neutral and constitute a cylinder 27 having communication with the atmosphere by way of a conduit 28 and with the interior of the casing by way of a conduit 29 provided with an adjustable bleed 30. A piston 31 is mounted for reciprocal movement within the cylinder 27 and is provided with a piston rod 32 guided against lateral movement by means of a guide member 33 and having the free end thereof formed in the manner of a cam arm so as to cooperate with a roller member on a portion of pin 23, as better shown and described in the issued patent to Paul W. Koch and Victor E. Carbonara, 2,010,191, dated August 6, 1935.

The pointer 18 is arranged to traverse a suitable dial 34 carried by the casing and having an opening 35 at the lower portion thereof through which shaft 19 extends. The dial is further provided with a transverse arcuate slot 36 (Fig. 2) through which a bank indicator may be viewed such, for example, as the ball type which consists of a curved glass vessel 37 filled with suitable damping liquid and sealed as indicated at 38, and having a ball 39 fitting snugly in the curved portion thereof and normally remaining between reference marks 40. A cover glass 41 is secured to the front of the casing by way of a clamping ring 42 to expose to view the pointer, dial, and bank indicator.

The rotor 14 is provided with suitable vanes or buckets 43 at the outer periphery thereof whereby fluid driving medium from any suitable source is directed to impinge upon the vanes 43 by way of nozzle 44, the outer end of which may be provided with a dust cap 45. A conduit 46 is further provided for the casing for exhausting the air within the casing after its impingement upon the rotor.

Due to surges within the pressure supply line the speed of rotation of the rotor will be varied accordingly and in order to maintain the rotor speed substantially constant, permanent magnetic bars 47 are embedded into the rotor having both ends exposed at the sides of the rotor as better shown in Figure 3. A pivoted metal vane 48 formed in the manner of a yoke is mounted upon the gimbal frame by means of pins 49 for limited angular movement thereabout and is provided with a tapered notch 50 for a purpose which will appear more fully hereinafter. Vane 48 may be formed of any suitable electrical conducting material such as copper or aluminum, and is constrained against movement by means of a spring member 51 secured to the vane at one end thereof and anchored to a supporting member 52 fastened to the gimbal frame at the other end thereof. The vane 48 is normally constrained to a position wherein the tapered notch 50 rests underneath the nozzle 44 and the full impact of the fluid medium issuing from the nozzle impinges upon the rotor buckets 43 to exert its maximum driving force thereon.

A second yoke member 53 is secured to the gimbal frame as shown in Figure 3 and is provided with arms 54 which extend at the sides of vane 48 and form a small clearance space or air gap therebetween. Yoke member 53 is formed of suitable material having a high permeability, such as soft iron, thus defining a return magnetic path or by-pass for the fields of the bar magnets 47.

Assuming an N pole of the bar magnets at the visible end of the rotor, the field of one of the magnetic bars, as it passes under vane 48, will traverse the vane and air gap and pass through yoke member 53 back to the S pole of the magnetic bar. Eddy currents are set up in the vane 48 at this point due to the traversing field and provide auxiliary magnetic fields which coact with the magnetic bar fields causing a drag action upon the vane which, during normal speed of rotation of the rotor, is overcome by the spring 51 and during increased speed of rotation drags the vane 48 angularly against the action of the spring.

In operation, and during a normal speed of rotation of the rotor, the magnetic coaction of the two fields is overcome by the spring 51 and the vane 48 is maintained in a normal predetermined position whereby the driving medium issuing from the nozzle 44 impinges fully upon the rotor buckets 43 through the tapered notch 50 of the vane 48.

When a surge in the pressure line occurs the speed of rotation of the rotor is increased due to the increased pressure acting thereon. The magnetic bars 47, in this instant, pass more rapidly under the vane 48 and the eddy currents set up in the vane increase in proportion to the increased speed of rotation thereby providing increased magnetic fields. The increased local fields set up by the eddy currents in the vane coact with the magnetic bar fields and the resulting torque is great enough to overcome the action of spring 51 thereby dragging the vane 48 to move downwardly displacing tapered notch 50 relative to the nozzle 44 whereby the driving medium or a portion thereof impinges upon the vane 48 thus preventing impingement upon the rotor buckets 43 thereby slowing the rotor down. With a decreased speed of rotation of the rotor the magnetic bars 47 pass less rapidly under the vane 48 thereby decreasing the eddy currents in the vane, and consequently the local magnetic fields set up due to the eddy currents. The coaction of the two fields produces a smaller torque and the spring 51 is effective to return vane 48 back to its normal position whereby the fluid driving medium again fully impinges upon the rotor buckets through the tapered notch 50.

It will now readily appear to one skilled in the art that a novel and desirable arrangement has been provided for maintaining the speed of rotation of a gyro rotor substantially constant in that during normal rotation local eddy currents are created whose effect is overcome by a spring member while during increased speeds the eddy currents are increased proportionately setting up local magnetic fields sufficient to overcome the action of the spring thereby actuating a movable control member for modifying the driving force of the fluid medium issuing from the supply nozzle.

Although but one embodiment of the present invention has been illustrated and described in detail, it is to be expressly understood that the invention is not limited thereto. Various changes in the design and arrangement of the parts can be made without departing from the spirit and scope of the invention and the same will now be understood by those skilled in the art. For a definition of the limits of the invention, reference will be had primarily to the appended claims.

What is claimed is:

1. Speed control means for a fluid pressure driven rotor comprising means directing said fluid pressure to spin said rotor, obstructing means for intercepting fluid pressure issuing from said directing means having a member mounted for movement between said rotor and said directing means and normally held in an unobstructing position, and magnetic field producing means associated with said rotor for generating a coacting local magnetic field in said member to drag said member to an obstructing position.

2. Speed control means for a fluid pressure driven rotor comprising means directing said fluid pressure to spin said rotor, obstructing means for intercepting fluid pressure issuing from said directing means having a member mounted for movement between said rotor and said directing means, means resiliently constraining said member in a normally unobstructing position, and magnetic field producing means carried by said rotor for generating a coacting local magnetic field in said member to drag said member to an obstructing position.

3. Speed control means for a fluid pressure driven rotor comprising means directing said fluid pressure to spin said rotor, obstructing means for intercepting fluid pressure issuing from said directing means having a metallic vane mounted for movement between said rotor and said directing means and normally held in an unobstructing position, and magnetic field producing means carried by and rotatable with said rotor for generating a coacting local magnetic field in said vane to drag said vane to an obstructive position.

4. Speed control means for a fluid pressure driven rotor comprising means directing said fluid pressure to spin said rotor, obstructing means for intercepting fluid pressure issuing from said directing means having a metallic vane mounted for pivotal movement between said rotor and said directing means, means resiliently constraining said vane in a normally unobstructing position, and magnetic inserts mounted within said rotor for generating a coacting local magnetic field in said vane to drag said vane to an obstructing position.

5. Speed control means for a fluid pressure driven rotor comprising means directing said fluid pressure to spin said rotor, obstructing means for intercepting fluid pressure issuing from said directing means having a metallic vane mounted for pivotal movement between said rotor and said directing means and normally resiliently held in an unobstructing position, and magnetic inserts mounted in said rotor and arranged in parallel about the axis of rotation of said rotor for generating a coacting local magnetic field in said vane to drag said vane to an obstructing position.

6. Speed control means for a fluid pressure driven rotor comprising means directing said fluid pressure to spin said rotor, a frame mounting said rotor for rotation thereon, a metallic member mounted for pivotal movement on said frame for intercepting fluid pressure issuing from said directing means and normally resiliently held out of said intercepting position, and magnets carried by said rotor for generating a coacting local magnetic field in said member to drag said member to said intercepting position.

7. Speed control means for a fluid pressure driven rotor comprising means directing said fluid pressure to spin said rotor, a frame mounting said rotor for rotation thereon, a metallic yoke member mounted for pivotal movement on said frame for intercepting fluid pressure issuing from said directing means, means resiliently constraining said member out of said intercepting position, and magnetic field producing means carried by and rotatable with said rotor for generating a coacting local magnetic field in said member to drag said member to said intercepting position.

8. Speed control means for a fluid pressure driven rotor mounted for rotation within a supporting frame, means directing fluid pressure against said rotor for rotating the latter, means providing a magnetic field mounted for rotation with said rotor, a metallic vane mounted for angular movement on said frame for controlling the action of said fluid pressure upon said rotor, and resilient means normally maintaining said vane in a predetermined normal position wherein the fluid pressure is directed against said rotor, said magnetic field means passing adjacent said vane thereby setting up eddy currents in said vane in proportion to the speed of rotation of said rotor, said currents providing auxiliary magnetic fields coacting with the field of said magnetic field means whereby a torque is produced angularly moving said vane against the action of said resilient means to intercept said fluid pressure.

9. Speed control means for a fluid pressure driven rotor mounted for rotation within a supporting frame, means directing fluid pressure against said rotor for rotating the latter, means providing a magnetic field mounted for rotation with said rotor, means mounted on said frame having a high permeability for defining a by-pass for said magnetic field, a metallic vane mounted for angular movement on said frame for controlling the action of said fluid pressure upon said rotor, and resilient means normally maintaining said vane in a predetermined normal position wherein the fluid pressure is directed against said rotor, said magnetic field means passing adjacent said vane thereby setting up eddy currents in said vane in proportion to the speed of rotation of said rotor, said currents providing local magnetic fields adapted to coact with the field of said magnetic field means whereby a torque is produced for angularly moving said vane against the action of said resilient means to intercept said fluid pressure.

WLADIMIR A. REICHEL.